United States Patent [19]

Collins

[11] Patent Number: 4,605,966
[45] Date of Patent: Aug. 12, 1986

[54] ERROR CONCEALMENT IN DIGITAL TELEVISION SIGNALS

[75] Inventor: Mark C. Collins, Basingstoke, United Kingdom

[73] Assignee: Sony Corporation, Tokyo, Japan

[21] Appl. No.: 494,324

[22] Filed: May 13, 1983

[30] Foreign Application Priority Data

May 14, 1982 [GB] United Kingdom ............ 8214086

[51] Int. Cl.[4] .................. H04N 5/14; H04N 5/21
[52] U.S. Cl. .................. 358/160; 358/163; 358/167; 358/21 R; 358/336; 382/52; 382/54; 360/38.1
[58] Field of Search ............ 358/160, 163, 166, 167, 358/21 R, 37, 314, 336, 280, 282, 30, 39, 40; 382/52, 54; 360/38.1

[56] References Cited

U.S. PATENT DOCUMENTS

| | | | |
|---|---|---|---|
| 4,381,519 | 4/1983 | Wilkinson et al. | 358/21 R |
| 4,419,693 | 12/1983 | Wilkinson | 358/167 |
| 4,470,065 | 9/1984 | Reitmeier | 358/163 |
| 4,485,399 | 11/1984 | Schulz et al. | 358/280 |
| 4,498,104 | 2/1985 | Schulz | 358/160 |

Primary Examiner—James J. Groody
Assistant Examiner—Michael D. Parker
Attorney, Agent, or Firm—Lewis H. Eslinger; Alvin Sinderbrand

[57] ABSTRACT

A method of concealing errors in a digital television signal formed by a plurality of sample signals corresponding respectively to sample positions along a horizontal scan line of a television picture made up of a plurality of such lines, the method comprising, in respect of each sample signal which is in error, selecting from a plurality of algorithms a preferred algorithm for correcting the error sample signal, calculating a corrected value of the error sample signal using the preferred algorithm, and substituting the corrected sample signal for the error sample signal so as to conceal the error. Where any algorithm involves the use of an error sample, that algorithm is not used. The algorithms may be twelve in number and use sample values located along four directions of the television picture to predict the known sample values at sample positions adjacent to the position of the error sample signal, the direction corresponding to the algorithm giving the best result being selected.

10 Claims, 4 Drawing Figures

ERROR CONCEALMENT IN DIGITAL TELEVISION SIGNALS

BACKGROUND OF THE INVENTION

1. Field of the Invention

This invention relates to error concealment in digital television signals.

2. Description of the Prior Art

Recently there has been an increasing interest in the use of digital techniques for television signals. Such techniques are, for example, used in some video tape recording arrangements where an incoming television signal to be recorded is sampled, the samples are coded into digital form, the digital data signals are recorded and subsequently reproduced by a video tape recorder (VTR), the reproduced digital data signals are decoded, and the decoded signals are used to form an analog signal corresponding to the original television signal.

If errors occur in the handling of the digital signals, for example due to noise or drop-out occurring in the VTR, the digital signals are lost or corrupted and then the reformed television signal does not correspond exactly to the original television signal, and a resulting television picture is degraded.

There are two main approaches to dealing with errors in digital television signals. The first approach is correction, which involves the production and use of additional data signals purely for the purposes of error detection and correction, these additional data signals otherwise being redundant. While correction provides good results, it cannot generally be used as the sole means of dealing with errors, because a comprehensive correction capability would require an excessive amount of additional data which might overload the data handling paths or raise the data rate to an unacceptable level. The second approach, with which the present invention is more particularly concerned, is concealment. This comprises the replacement of corrupted data signals by data signals generated using available uncorrupted data signals. This method relies largely for accuracy on the strong correlation that exists in a television signal.

In our co-pending UK Patent Application No. 8011090 (Ser. No. 2073534), the corresponding co-pending European Patent Application No. 81301156.6 (Ser. No. 0037212), and the corresponding U.S. Pat. No. 4,419,693 we have disclosed a method of error concealment which comprises selecting from a plurality of algorithms a preferred algorithm for calculating a corrected value for use in concealment of an error sample, calculating a corrected value for the sample using the preferred algorithm, and replacing the error sample by the corrected value sample. This method works well so long as the density of errors is not too great, but as the error density increases the method becomes less effective. This problem will be discussed further below.

SUMMARY OF THE INVENTION

One object of the present invention is to provide a method of concealing errors in a digital television signal by selecting a preferred algorithm for calculation of a corrected sample signal for concealing an error sample signal.

Another object of the present invention is to provide a method of concealing errors in a digital television signal by selecting a preferred algorithm for calculation of a corrected sample signal for concealing an error sample signal from among a plurality of algorithms, any said algorithm which involves the use of an error sample signal not being used.

Another object of the present invention is to provide a method of concealing errors in a digital television signal by selecting a preferred algorithm for calculation of a corrected sample signal for concealing an error sample signal from among algorithms corresponding to different directions in a television picture.

According to the present invention there is provided a method of concealing errors in a digital television signal, which television signal comprises a plurality of component sample signals corresponding respectively to sample positions along a horizontal scan line of a television picture made up of a plurality of such lines, the method comprising, in respect of each said sample signal which is in error:

calculating a first concealment accuracy by calculating from available sample signals disposed along a first direction of said television picture and to one side of the sample position of said error sample signal the expected value of a first sample signal adjacent to said sample position of said error sample signal, checking said expected value of said first sample signal against the actual value of said first sample signal, and suppressing said first concealment accuracy if its calculation involves the use of any error sample signal;

calculating a second concealment accuracy by calculating from available sample signals disposed along said first direction of said television picture and to the other side of said sample position of said error sample signal the expected value of a second sample signal adjacent to said sample position of said error sample signal, checking said expected value of said second sample signal against the actual value of said second sample signal, and suppressing said second concealment accuracy if its calculation involves the use of any error sample signal;

calculating a third concealment accuracy as the sum of said first and second concealment accuracies when neither said first nor said second concealment accuracy is suppressed;

calculating a fourth concealment accuracy by calculating from available sample signals disposed along a second direction different from said first direction of said television picture and to one side of said sample position of said error sample signal the expected value of a third sample signal adjacent to said sample position of said error sample signal, checking said expected value of said third sample signal against the actual value of said third sample signal, and suppressing said fourth concealment accuracy if its calculation involves the use of any error sample signal;

calculating a fifth concealment accuracy by calculating from available sample signals disposed along said second direction of said television picture and to the other side of said position of said error sample signal the expected value of a fourth sample signal adjacent to said sample position of said error sample signal, checking said expected value of said fourth sample signal against the actual value of said fourth sample signal, and suppressing said fifth concealment accuracy if its calculation involves the use of any error sample signal;

calculating a sixth concealment accuracy as the sum of said fourth and fifth concealment accuracies when neither said fourth nor said fifth concealment accuracy is suppressed;

selecting from the available said concealment accuracies a preferred direction of said television picture for correcting said error sample signal; calculating a corrected value of said error sample signal using available sample signals disposed along said preferred direction; and substituting said corrected sample signal for said error sample signal so as to conceal the error.

According to the present invention there is also provided apparatus for concealing errors in a digital television signal, which television signal comprises a plurality of component sample signals corresponding respectively to sample positions along a horizontal scan line of a television picture made up of a plurality of such lines, the apparatus comprising:

means for calculating a first concealment accuracy by calculating from available sample signals disposed along a first direction of said television picture and to one side of the sample position of a sample signal which is in error the expected value of a first sample signal adjacent to said sample position of said error sample signal, checking said expected value of said first sample signal against the actual value of said first sample signal, and suppressing said first concealment accuracy if its calculation involves the use of any error sample signal;

means for calculating a second concealment accuracy by calculating from available sample signals disposed along said first direction of said television picture and to the other side of said sample position of said error sample signal the expected value of a second sample signal adjacent to said sample position of said error sample signal, checking said expected value of said second sample signal against the actual value of said second sample signal, and suppressing said second concealment accuracy if its calculation involves the use of any error sample signal;

means for calculating a third concealment accuracy as the sum of said first and second concealment accuracies when neither said first nor said second concealment accuracy is suppressed;

means for calculating a fourth concealment accuracy by calculating from available sample signals disposed along a second direction different from said first direction of said television picture and to one side of said sample position of said error sample signal the expected value of a third sample signal adjacent to said sample position of said error sample signal, checking said expected value of said third sample signal against the actual value of said third sample signal, and suppressing said fourth concealment accuracy if its calculation involves the use of any error sample signal;

means for calculating a fifth concealment accuracy by calculating from available sample signals disposed along said second direction of said television picture and to the other side of said position of said error sample signal the expected value of a fourth sample signal adjacent to said sample position of said error sample signal, checking said expected value of said fourth sample signal against the actual value of said fourth sample signal, and suppressing said fifth concealment accuracy if its calculation involves the use of any error sample signal;

means for calculating a sixth concealment accuracy as the sum of said fourth and fifth concealment accuracies when neither said fourth nor said fifth concealment accuracy is suppressed;

means for selecting from the available said concealment accuracies a preferred direction of said television picture for correcting said error sample signal;

means for calculating a corrected value of said error sample signal using available sample signals disposed along said preferred direction; and means for substituting said corrected sample signal for said error sample signal so as to conceal the error.

The above, and other objects, features and advantages of this invention will be apparent from the following detailed description of illustrative embodiments which is to be read in connection with the accompanying drawings.

DESCRIPTION OF THE PREFERRED EMBODIMENTS

Before describing an embodiment of the invention, and to assist understanding of the embodiment, further reference will first be made to the problem mentioned above.

Figure 1:
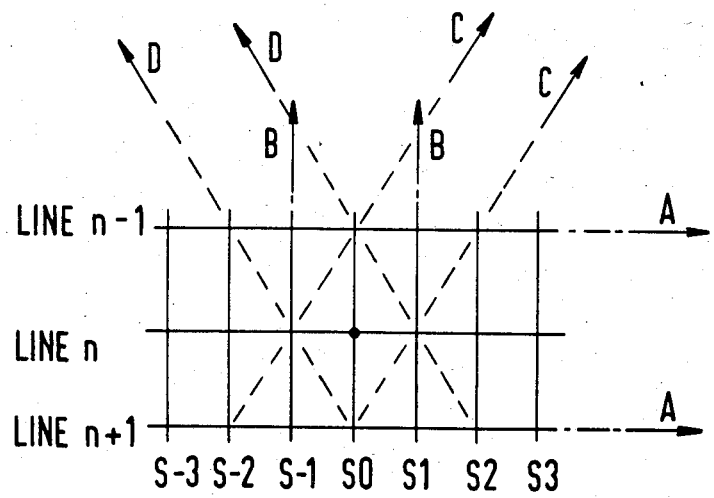
FIG. 1 shows a matrix of sample positions in a television picture.

Referring to FIG. 1, this shows part of a television raster, and in particular parts of three consecutive horizontal scan lines labelled line n−1, line n and line n+1. The sample positions are disposed at regular intervals along each of the lines, the intervals corresponding to a sampling frequency of say 13.5 MHz, and the sample positions being aligned in the vertical direction. Reading from the left, consecutive sample positions in each line are labelled S−3, S−2, S−1, S0, S1, S2 and S3. Using this notation, any sample position in the matrix can be designated by the line and the sample number, and for the purpose of this discussion it is assumed that the sample position at which there is an error sample signal requiring concealment is in line n at position S0, this being designated n, S0.

As disclosed in our above-mentioned applications, a corrected value for the sample position n, S0 could be estimated in one of four different ways. Firstly, the average could be taken of the two samples in line n adjacent to and on each side of the sample position n, S0. Secondly, the average could be taken of the two sample values in line n−1 and line n+1 adjacent to and vertically above and below the sample position n, S0. Thirdly, the average could be taken of the two sample values in line n−1 and line n+1 and on either side of the sample position n, S0 along the positive diagonal direction. Fourthly, the average could be taken of the two sample values in the line n−1 and line n+1 adjacent to and on either side of the sample position n, S0 and along the negative diagonal direction. These four directions are indicated by the arrows A, B, C and D respectively.

Each of these possibilities may be thought of as an algorithm for calculating a corrected value, and it will be appreciated that it is likely that one of these algorithms will give a better result than any of the others. The direction to be used is therefore selected by testing each algorithm using known sample values to see which gives the best result, and then using a corrected value derived using the direction corresponding to that preferred algorithm when substituting a corrected value sample.

As a further refinement, the results derived from the respective algorithms can be weighted. In other words, a value can be placed on the likely accuracy of the results obtained. This is necessary because the distance between adjacent sample positions is less in the horizontal direction than in the vertical direction, the difference amounting to a factor of approximately 1.625. For this reason, the algorithm using the horizontal direction is in fact most likely to give the nearest result, with the algorithm for the vertical direction being next best, and the two algorithms for the diagonal directions being the next best.

The four algorithms referred to above will now be specified in mathematical terms. Thus, the decision of concealment direction is made by investigating the adjacent sample values and obtaining the concealment accuracy for each direction. If the concealment accuracy is H for the horizontal direction, V for the vertical direction, $D^+$ for the positive diagonal direction and $D^-$ for the negative diagonal direction, then these concealment accuracies can be defined as follows:

$$H = \tfrac{1}{2} |\tfrac{1}{2}[(n-1),S-1+(n-1),S1] - (n-1),S0| + \tfrac{1}{2} |\tfrac{1}{2}[(n+1),S-1+(n+1),S1](n+1),S0| \quad (1)$$

that is to say, the concealment accuracy H equals the average of the horizontal concealment accuracy from the horizontal line immediately above and the horizontal line immediately below the horizontal line containing the error sample. The horizontal concealment accuracy for each such line (i.e., the lines immediately above and below the horizontal line containing the error sample) is determined by comparing the expected value of the sample signal with the actual value. The expected value is the average of the samples immediately before and after the sample that is immediately above or below the error sample. Thus the correction value is calculated using a plurality of mutually exclusive sets of sample signals disposed in the horizontal direction, each set including a plurality of sample signals. Likewise:

$$V = \tfrac{1}{2} |\tfrac{1}{2}[(n-1),S-1+(n+1),S-1] - n,S-1| + \tfrac{1}{2} |\tfrac{1}{2}[(n-1),S1+(n+1),S1] - n,S1| \quad (2)$$

$$D^+ = \tfrac{1}{2} |\tfrac{1}{2}[(n-1),S0+(n+1),S-2] - n,S-1| + \tfrac{1}{2} |\tfrac{1}{2}[(n-1),S2+(n+1),S0] - n,S1| \quad (3)$$

$$D^- = \tfrac{1}{2} |[(n-1),S-2+(n+1),S0] - n,S-1| + \tfrac{1}{2} |\tfrac{1}{2}[(n-1),S0+(n+1),S2] - n,S1| \quad (4)$$

These four values H, V, $D^+$ and $D^-$ represent the accuracy of concealment for the sample values most closely connected with the error sample. The concealment accuracies and expected values are thus determined in accordance with equations (2), (3) and (4) analogously to the manner in which they are determined in accordance with equation (1). Preferably these values are each assigned a weighting coefficient to take account of the unequal spacings of the horizontal, vertical and diagonal samples. The smallest value is then used to select the direction of concealment.

The method has been described as applied to the luminance channel, that is to say concealment of errors occuring in luminance sample values. It is also necessary to consider the color difference channels, and here two possibilities arise.

Firstly, each color difference channel can be provided with a separate concealment selection arrangement independent of the arrangement for the luminance channel.

Secondly, because the first solution referred to above increases the amount of hardware required by approximately three, an alternative method which economizes on the amount of hardware required makes use of the fact that the chrominance information is related to the luminance information. That is, where a chrominance edge exists, so usually does a luminance edge. Based on this assumption it is possible to select the direction of colour difference concealment to be the same as that selected for luminance concealment. However, because the chrominance samples occur at only one third the frequency of the luminance samples along each horizontal line, a different set of weighting coefficients has to be used, these being optimized to the chrominance bandwidths.

Figure 2:
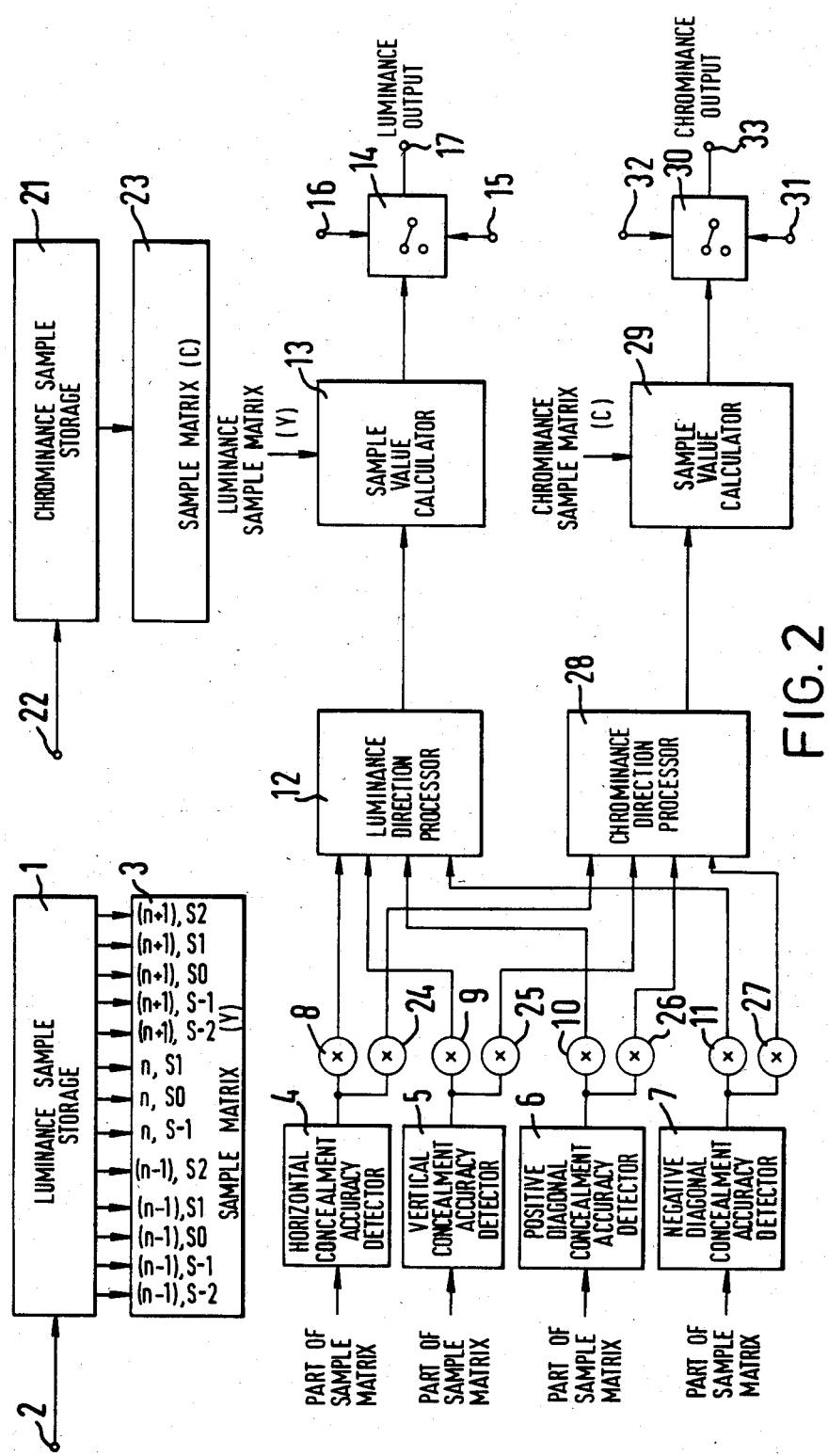
FIG. 2 shows in simplified block form apparatus for concealing errors in a digital television signal.

Referring to FIG. 2, this shows apparatus for concealing errors in a digital television signal. The apparatus comprises a luminance sample storage means 1 to which luminance input samples are supplied by way of an input terminal 2. The luminance sample storage means 1 supplies outputs to a luminance sample matrix storage means 3 which stores a moving matrix of sample values corresponding to the sample positions (n+1),S2; (n+1),S1; (n+1),S0; (n+1),S-1; (n+1),S-2; n,S1; n,S0; n,S-1; (n-1),S2; (n-1),S1; (n-1),S0; (n-1),S-1; and (n-1),S-2.

Four concealment accuracy detectors are provided, these being a horizontal concealment accuracy detector 4, a vertical concealment accuracy detector 5, a positive diagonal concealment accuracy detector 6 and a negative diagonal concealment accuracy detector 7. Each of the concealment accuracy detectors 4 to 7 is continuously supplied with the appropriate part of the sample matrix from the luminance sample matrix storage means 3. Thus the horizontal concealment accuracy detector 4, for example, receives or selects the sample values necessary to calculate the concealment accuracy H using algorithm (1) above, and supplies a signal representing the concealment accuracy H by way of a weighting multiplier 8 to a luminance direction processor 12. Likewise the concealment accuracy detectors 5 to 7 supply a respective signal representing the vertical concealment accuracy V, the positive diagonal concealment accuracy $D^+$ and the negative diagonal concealment accuracy $D^-$ by way of weighting multipliers 9, 10 and 11 respectively to the luminance direction processor 12. The weighting multipliers 8 to 11 effect the weighting referred to above to compensate for the different distances between adjacent sample positions in the various directions. The weighting may be done simply on the basis of distance between adjacent sample positions, in which case each weighting multiplier multiplies by the reciprocal of the distance between adjacent sample positions in the relevant direction. Other weightings can, however, be used.

The luminance direction processor 12 supplies an output signal representing the selected direction of concealment to a sample value calculator 13 which operates to select the appropriate samples from the luminance sample matrix storage means 3 and calculate therefrom the required concealment value to be used to conceal the error sample. For example, if the horizontal direction is selected, the sample value calculator 13 uses the sample values for the sample positions, n,S−1 and n,S1 to calculate the value to be used to conceal the error sample at the sample position n, S0. The concealment value is supplied to a selector 14 to which a switching signal is supplied by way of a terminal 15. The selector 14 is also supplied with the sample value from the sample position n,S0 by way of a terminal 16.

Preferably the apparatus as so far described operates continuously, that is to say concealment values are determined as described for every sample position and supplied to the selector 14. Only, however, when it has been determined that there is an error at a given sample position n,S0, is a signal supplied to the selector 14 by way of the terminal 15, whereupon the concealment value supplied from the calculator 13 is supplied to a luminance output terminal 17 in place of the sample value supplied by way of the terminal 16. At all other times, the sample value supplied by way of the terminal 16 is supplied to the luminance output terminal 17.

The fact that there is an error at a given sample position n,S0 can be determined in any suitable manner. For example, it may be determined that the data word representing the sample value is not valid.

The apparatus may also include arrangements for calculating concealment values for the color difference channels U and V. For simplicity, only that part of the apparatus necessary to calculate concealment values for the difference channel U is shown and will be described. For this purpose the apparatus comprises a chrominance sample storage means 21 to which chrominance input samples are supplied by way of an input terminal 22. The chrominance sample storage means 21 supplies outputs to a chrominance signal matrix storage means 23 which stores a moving matrix of sample values corresponding to those listed above in connection with the luminance sample matrix storage means 3, but adjusted to take account of the different spacing between adjacent chrominance samples.

Operating in time division multiplex for the luminance and chrominance samples respectively, the concealment accuracy detectors 4 to 7 derive signals representing the horizontal, vertical, positive diagonal and negative diagonal concealment accuracies H, V, D+ and D− for the chrominance difference channel U and supply the signals by way of respective chrominance weighting multipliers 24, 25, 26 and 27 to a chrominance direction processor 28 which supplies an output signal representing the selected direction of concealment to a sample value calculator 29 which operates to select the appropriate samples from the chrominance sample matrix storage means 23 and calculate therefrom the required concealment value to be used to conceal the error sample. The concealment error is supplied to a selector 30 to which a switching signal is supplied by way of a terminal 31. The selector 30 is also supplied with the sample value from the sample position n,S0 by way of a terminal 32.

As with the luminance part of the apparatus, the chrominance part of the apparatus preferably operates continuously. Only, however, when it has been determined there is an error at a given sample position n,S0, is a signal supplied to the selector 30 by way of the terminal 31, whereupon the concealment value supplied from the calculator 29 is supplied to a chrominance output terminal 33 in place of the sample value supplied by way of the terminal 32.

The chrominance part of apparatus may be duplicated for the color difference channel V or alternatively hardware can be saved by also using the direction selected for the color difference channel U for the colour difference channel V.

The method described is therefore an adaptive process and, as described in our above-mentioned applications, it is dependent on the frequency characteristics of the television picture. So long as the density of error samples is relatively low, effective concealment is achieved for all but the most critical of picture materials, because there is only a small probability of there being more than one error sample within the chosen sample space from which data values are used for the algorithms. However, as the density of error samples increases, the probability of there being more than one error sample within the sample space becomes greater, so the method becomes less effective. To reduce this problem, embodiments of the invention provide additional adaptation on the basis of error content.

Thus, in embodiments of the invention, in calculating a corrected value sample no direction of concealment is used if the resulting calculation involves the use of an error sample. In the present discussion it will be assumed that all error samples are identified as such by having an error flag, generally an additional bit "1", attached to the data word representing that sample. However, it is not necessary to exclude a direction of concealment merely because the concealment accuracy H, V, D+ or D− as set out above is invalidated by one or more error samples.

Consider, for example, the horizontal concealment accuracy H which is calculated from the above algorithm (1) repeated here:

$$H = \tfrac{1}{2}|\tfrac{1}{2}[(n-1),S-1+(n-1),S1]-(n-1),S0| + \tfrac{1}{2}|\tfrac{1}{2}[-(n+1),S-1+(n+1),S1]-(n+1),S0| \quad (1)$$

This aglorithm can be viewed as the sum of two component algorithms respectively bounded by the magnitude signs and it is possible for one of these component algorithms to be invalidated by one or more error samples, while the other component algorithm remains valid. Thus either of the component algorithms may be dropped in favor of the other in appropriate cases, and this results in two further algorithms for the horizontal concealment accuracy, as follows:

$$H_1 = |\tfrac{1}{2}[(n-1),S-1+(n-1),] - (n-1),S0| \quad (5)$$

and $$H_2 = |\tfrac{1}{2}[(n+1),S-1+(n+1),S1] - (n+1),S0| \quad (6)$$

Figure 3:
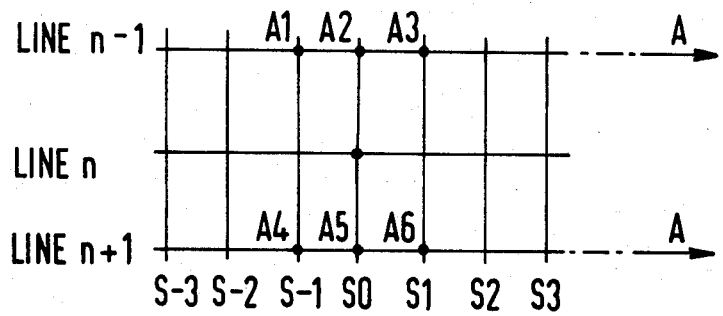
FIG. 3 shows a matrix of sample values in a television picture.

For ease of subsequent consideration actual values will be ascribed to each sample position as indicated in FIG. 3. Using these values the modified horizontal concealment accuracies can be more simply expressed as:

$$H_1 = |\tfrac{1}{2}(A1+A3) - A2| \quad (7)$$

and $$H_2 = |\tfrac{1}{2}(A4+A6) - A5| \quad (8) \text{ ps}$$

This approach can be similarly applied to the other concealment accuracies V, D+ and D−, for which modified concealment accuracies are derived as follows:

$$V_1 = |\tfrac{1}{2}[(n-1),S-1+(n+1),S-1] - n,S-1| \quad (9)$$

and $$V_2 = |\tfrac{1}{2}[(n-1),S1+(n+1),S1] - n,S1| \quad (10)$$

$$D_1^+ = |\tfrac{1}{2}[(n-1),S0+(n+1),S-2] - n,S-1| \quad (11)$$

and $$D_2^+ = |\tfrac{1}{2}[(n-1),S2+(n+1),S0] - n,S1| \quad (12)$$

$$D_1^- = |\tfrac{1}{2}[(n-1),S-2+(n+1),S0] - n,S-1| \quad (13)$$

and $$D_2^- = |\tfrac{1}{2}[(n-1),S0+(n+1),S2] - n,S1| \quad (14)$$

Use of these modified concealment accuracies has little effect on the frequency response of the method. Obviously the modified concealment accuracies are slightly less dependable, and this is particularly so when the sample space contains a discrete picture feature.

The method is implemented in practice by calculating from the sample values available each of the modified concealment accuracies. For example, for the horizontal direction the modified concealment accuracies $H_1$ and $H_2$ are calculated, but if either calculation involves the use of an error sample then that modified concealment accuracy is rejected. If neither is rejected, that is if no error sample is present among those used in these calculations, then the full horizontal concealment accuracy is calculated from:

$$H = \tfrac{1}{2}(H_1 + H_2) \quad (15)$$

Figure 4:
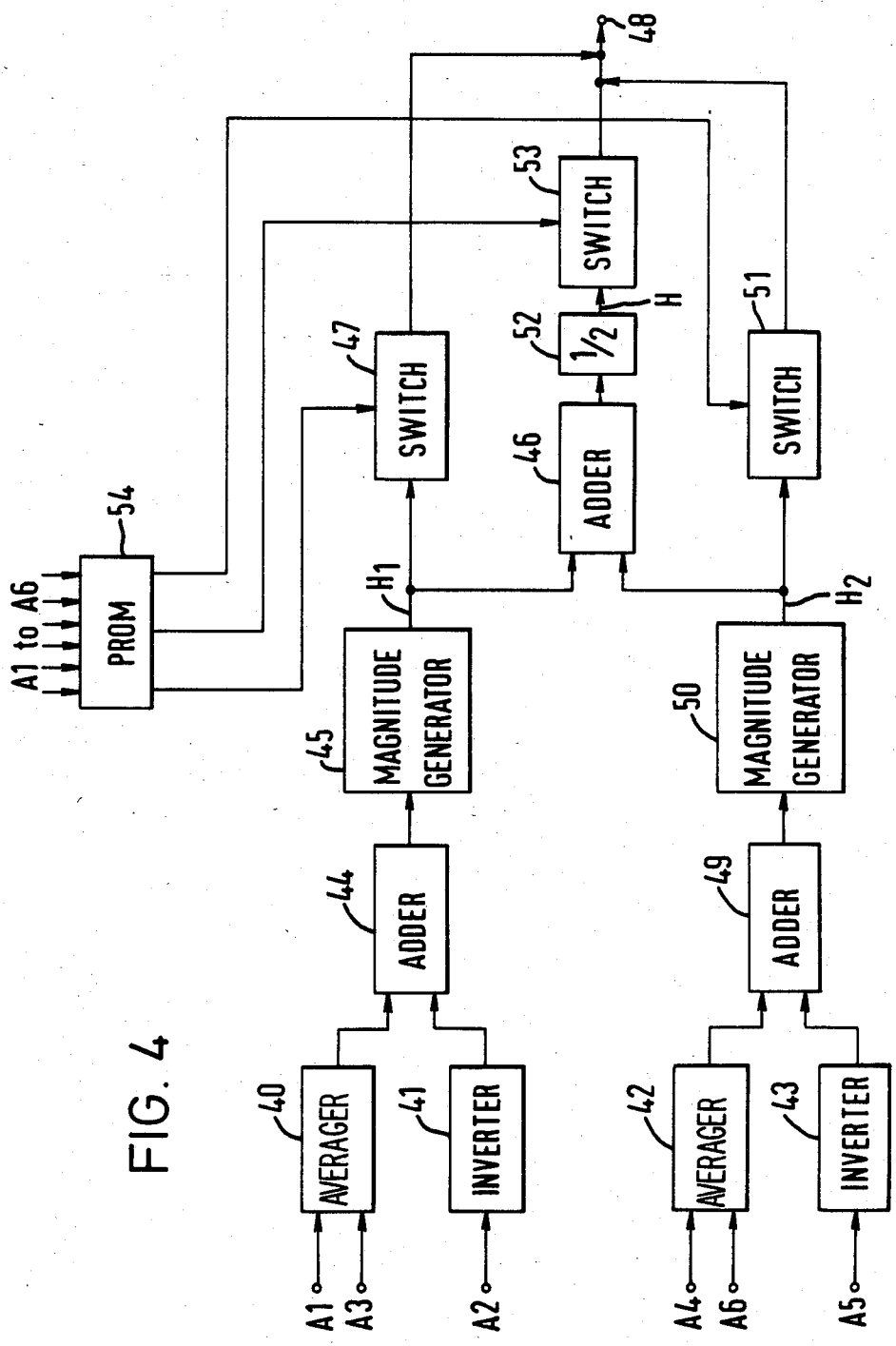
FIG. 4 shows part of the apparatus of FIG. 2 in more detailed block form.

These calculations are performed continuously and are most conveniently performed in the concealment accuracy detectors 4 to 7 of the apparatus of FIG. 2. FIG. 4, to which reference is now made, shows the necessary parts of the horizontal concealment accuracy detector 4, the arrangements for the other concealment accuracy detectors 5, 6 and 7 being similar.

The sample values $A_1$ and $A_3$ are supplied to an averager 40, the sample value $A_2$ is supplied to an inverter 41, the sample values $A_4$ and $A_6$ are supplied to an averager 42, and the sample value $A_5$ is supplied to an inverter 43. The averager 40 forms the sum $\tfrac{1}{2}(A_1+A_3)$ which is supplied to an adder 44, as is the output of the inverter 41. The adder 44 thus forms the sum $\tfrac{1}{2}(A_1+A_3)-A_2$ which is supplied to a magnitude generator 45, the output of which is the horizontal concealment accuracy $H_1$ of expression (7), and this is supplied to an adder 46 and by way of a switch 47 to an output terminal 48. The averager 42 forms the sum $\tfrac{1}{2}(A_4+A_6)$ which is supplied to an adder 49, as is the output of the inverter 43. The adder 49 thus forms the sum $\tfrac{1}{2}(A_4+A_6)-A_5$ which is supplied to a magnitude generator 50, the output of which is the horizontal concealment accuracy $H_2$ of expression (8), and this is supplied to the adder 46 and by way of a switch 51 to the output terminal 48. The adder 46 forms the sum $H_1+H_2$ which is halved in a divider circuit 52 to form the full horizontal concealment accuracy H of expressions (1) and (15), and this is supplied by way of a switch 53 to the output terminal 48. The switches 47, 51 and 53 are controlled by respective outputs from a programmable read-only memory (PROM) 54. The error flags of the sample values $A_1$ to $A_6$ are also supplied to the PROM 53.

The operation is as follows. If there are no error samples among the sample values $A_1$ to $A_6$ the PROM 54 opens the switch 53 and closes the switches 47 and 51. If there are error samples among the sample values $A_1$ to $A_3$ but not among the sample values $A_4$ to $A_6$, the PROM 54 opens the switch 51 and closes the switches 47 and 53. If there are error samples among the sample values $A_4$ to $A_6$ but not among the sample values $A_1$ to $A_3$, the PROM 54 opens the switch 47 and closes the switches 51 and 53. If there are error samples among the sample values $A_1$ to $A_3$ and among the sample values $A_4$ to $A_6$, the PROM 54 closes the switches 47, 51 and 53.

So far as the succeeding stages of the apparatus of FIG. 2 are concerned, the operation is the same whether the horizontal concealment accuracy supplied to the output terminal 48 is H, $H_1$ or $H_2$. If none of these is supplied then the horizontal direction of concealment is rejected and the direction of concealment is selected from the remaining three directions.

Similar apparatus is provided for the other three directions of concealment and operates in a similar way to derive the concealment accuracies V, $D^+$ and $D^-$ of expressions (2) to (4), and $V_1$, $V_2$, $D_1^+$, $D_2^+$, $D_1^-$ and $D_2^-$ of expressions (9) to (14).

If the density of error samples is so large that none of the above twelve concealment accuracies are supplied, that is, all the concealment algorithms involve error samples, then the apparatus may be arranged to fall back on using the horizontal direction, because in general this is the direction most likely to give the best result. Alternatively concealment may be based on some different approach such as using sample values from corresponding positions in a preceding field of the television signal.

Various modifications and changes are of course possible. For example, it is not essential to use concealment accuracies for all four of the directions mentioned above, and some different number, such as two may be used in some embodiments.

It will be noted that the invention is not limited to any particular form of television system. Moreover, the invention is not limited to concealment of errors which have arisen in the course of recording and reproducing from a VTR, but may be used in any situation where errors have arisen in processing, transmitting or handling a digital television signal.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A method of concealing errors in a digital television signal, which television signal comprises a plurality of component sample signals corresponding respectively to sample positions along a horizontal scan line of a television picture made up of a plurality of such lines, the method comprising, in respect of each said sample signal which is in error:

calculating a first concealment accuracy by calculating from available sample signals disposed along a first direction of said television picture and to one side of the sample position of said error sample signal the expected value of a first sample signal adjacent to said sample position of said error sample signal, checking said expected value of said first sample signal against the actual value of said first sample signal, and suppressing said first concealment accuracy if its calculation involves the use of any error sample signal;

calculating a second concealment accuracy by calculating from available sample signals disposed along said first direction of said television picture and to the other side of said sample position of said error sample signal the expected value of a second sample signal adjacent to said sample position of said error sample signal, checking said expected value of said second sample signal against the actual value of said second sample signal, and suppressing said second concealment accuracy if its calculation involves the use of any error sample signal;

calculating a third concealment accuracy as the sum of said first and second concealment accuracies when neither said first nor said second concealment accuracy is suppressed;

calculating a fourth concealment accuracy by calculating from available sample signals disposed along a second direction different from said first direction of said television picture and to one side of said sample position of said error sample signal the expected value of a third sample signal adjacent to said sample position of said error sample signal, checking said expected value of said third sample signal against the actual value of said third sample signal, and suppressing said fourth concealment accuracy if its calculation involves the use of any error sample signal;

calculating a fifth concealment accuracy by calculating from available sample signals disposed along said second direction of said television picture and to the other side of said position of said error sample signal the expected value of a fourth sample signal adjacent to said sample position of said error sample signal, checking said expected value of said fourth sample signal against the actual value of said fourth sample signal, and suppressing said fifth concealment accuracy if its calculation involves the use of any error sample signal;

calculating a sixth concealment accuracy as the sum of said fourth and fifth concealment accuracies when neither said fourth nor said fifth concealment accuracy is suppressed;

selecting from the available said concealment accuracies a preferred direction of said television picture for correcting said error sample signal;

calculating a correction value for said error sample signal using available sample signals disposed along said preferred direction; and substituting said correction value for said error sample signal so as to conceal the error.

2. A method according to claim 1 further comprising:

calculating a seventh concealment accuracy by calculating from available sample signals disposed along a third direction different from said first or second direction of said television picture and to one side of said sample position of said error sample signal the expected value of a fifth sample signal adjacent to said sample position of said error sample signal, checking said expected value of said fifth sample signal against the actual value of said fifth sample signal, and suppressing said seventh concealment accuracy if its calculation involves the use of any error sample signal;

calculating an eighth concealment accuracy by calculating from available sample signals disposed along said third direction of said television picture and to the other side of said sample position of said error sample signal the expected value of a sixth sample signal adjacent to said sample position of said error sample signal, checking said expected value of said sixth sample signal against the actual value of said sixth sample signal, and suppressing said eighth concealment accuracy if its calculation involves the use of any error sample signal;

calculating a ninth concealment accuracy as the sum of said seventh and eighth concealment accuracies when neither said seventh nor said eighth concealment accuracy is suppressed;

calculating a tenth concealment accuracy by calculating from available sample signals disposed along a fourth direction different from said first, second or third direction of said television picture and to one side of said sample position of said error sample signal the expected value of a seventh sample signal adjacent to said sample position of said error sample signal, checking said expected value of said seventh sample signal against the actual value of said seventh sample signal, and suppressing said tenth concealment accuracy if its calculation involves the use of any error sample signal;

calculating an eleventh concealment accuracy by calculating from available sample signals disposed along said fourth direction of said television picture and to the other side of said position of said error sample signal the expected value of an eighth sample signal adjacent to said sample position of said error sample signal, checking said expected value of said eighth sample signal against the actual value of said eighth sample signal, and suppressing said eleventh concealment accuracy if its calculation involves the use of any error sample signal; and calculating a twelfth concealment accuracy as the sum of said tenth and eleventh concealment accuracies when neither said tenth nor said eleventh concealment accuracy is suppressed.

3. A method according to claim 2 including the further steps of choosing said first, second, third, and fourth directions as horizontal, vertical, positive diagonal, and negative diagonal directions, respectively, of said television picture.

4. A method according to claim 3 wherein n,S0 represents the sample value at a sample position S0 in a horizontal scan line n, and wherein the steps of calculating said concealment accuracies includes the steps of using first, second and third algorithms to calculate respective said first, second and third horizontal concealment accuracies $H_1$, $H_2$ and $H$ as follows:

$$H_1 = |\tfrac{1}{2}[(n-1), S-1+(n-1), S1]-(n-1), S0|$$

$$H_2 = |\tfrac{1}{2}[(n+1), S-1+(n+1), S1]-(n+1), S0|$$

$$H = \tfrac{1}{2}(H_1+H_2)$$

using fourth, fifth and sixth algorithms to calculate respective said fourth, fifth and sixth vertical concealment accuracies $V_1$, $V_2$ and $V$ as follows:

$$V_1 = |\tfrac{1}{2}[(n-1), S-1+(n+1), S-1]-n, S-1|$$

$$V_2 = |\tfrac{1}{2}[(n-1), S1 + (n+1), S1] - n, S-1|$$

$$V = \tfrac{1}{2}(V_1 + V_2)$$

using seventh, eighth and ninth algorithms to calculate respective said positive diagonal concealment accuracies $D+_1$, $D+_2$ and $D+$ as follows:

$$D_1^+ = |\tfrac{1}{2}[(n-1), S0+(n+1), S-2], S-1|$$

$$D_2^+ = |\tfrac{1}{2}[(n-1), S2+(n+1), S0] - n, S1|$$

$$D^+ = \tfrac{1}{2}(D_1 + D_2)$$

and using tenth, eleventh and twelfth algorithms to calculate respective said negative diagonal concealment accuracies $D-_1$, $D-_2$ and $D-$ as follows:

$$D_1^- = |\tfrac{1}{2}[(n-1), S-2+(n+1), S0] - n, S-1|$$

$$D_2^- = |\tfrac{1}{2}[(n-1), S0+(n+1), S2] - n, S1|$$

$$D- = \tfrac{1}{2}(D-_1 + D-_2).$$

5. A method according to claim 4 further including the steps of assigning a weighting factor corresponding to the reciprocal of the distance between adjacent sample positions in the respective horizontal, vertical, positive diagonal, and negative diagonal direction; multiplying said calculated concealment accuracies by said assigned weighting factors and selecting said preferred direction using the algorithm giving the lowest value of concealment accuracy after said multiplying step.

6. Apparatus for concealing errors in a digital television signal, which television signal comprises a plurality of component sample signals corresponding respectively to sample positions along a horizontal scan line of a television picture made up of a plurality of such lines, the apparatus comprising:

means for calculating a first concealment accuracy by calculating from available sample signals disposed along a first direction of said television picture and to one side of the sample position of a sample signal which is in error the expected value of a first sample signal adjacent to said sample position of said error sample signal, checking said expected value of said first sample signal against the actual value of said first sample signal, and suppressing said first concealment accuracy if its calculation involves the use of any error sample signal;

means for calculating a second concealment accuracy by calculating from available sample signals disposed along said first direction of said television picture and to the other side of said sample position of said error sample signal the expected value of a second sample signal adjacent to said sample position of said error sample signal, checking said expected value of said second sample signal against the actual value of said second sample signal, and suppressing said second concealment accuracy if its calculation involves the use of any error sample signal;

means for calculating a third concealment accuracy as the sum of said first and second concealment accuracies when neither said first nor said second concealment accuracy is suppressed;

means for calculating a fourth concealment accuracy by calculating from available sample signals disposed along a second direction different from said first direction of said television picture and to one side of said sample position of said error sample signal the expected value of a third sample signal adjacent to said sample position of said error sample signal, checking said expected value of said third sample signal against the actual value of said third sample signal, and suppressing said fourth concealment accuracy if its calculation involves the use of any error sample signal;

means for calculating a fifth concealment accuracy by calculating from available sample signals disposed along said second direction of said television picture and to the other side of said position of said error sample signal the expected value of a fourth sample signal adjacent to said sample position of said error sample signal, checking said expected value of said fourth sample signal against the actual value of said fourth sample signal, and suppressing said fifth concealment accuracy if its calculation involves the use of any error sample signal;

means for calculating a sixth concealment accuracy as the sum of said fourth and fifth concealment accuracies when neither said fourth nor said fifth concealment accuracy is suppressed;

means for selecting from the available said concealment accuracies a preferred direction of said television picture for correcting said error sample signal;

means for calculating a correction value for said error sample signal using available sample signals disposed along said preferred direction; and means for substituting said correction value for said error sample signal so as to conceal the error.

7. Apparatus according to claim 6 further comprising:

means for calculating a seventh concealment accuracy by calculating from available sample signals disposed along a third direction different from said first or second direction of said television picture and to one side of said sample position of said error sample signal the expected value of a fifth sample signal adjacent to said sample position of said error sample signal, checking said expected value of said fifth sample signal against the actual value of said fifth sample signal, and suppressing said seventh concealment accuracy if its calculation involves the use of any error sample signal;

means for calculating an eighth concealment accuracy by calculating from available sample signals disposed along said third direction of said television picture and to the other side of said sample position of said error sample signal the expected value of a sixth sample signal adjacent to said sample position of said error sample signal, checking said expected value of said sixth sample signal against the actual value of said sixth sample signal, and suppressing said eighth concealment accuracy if its calculation involves the use of any error sample signal;

means for calculating a ninth concealment accuracy as the sum of said seventh and eighth concealment accuracies when neither said seventh nor said eighth concealment accuracy is suppressed;

means for calculating a tenth concealment accuracy by calculating from available sample signals disposed along a fourth direction different from said first, second or third direction of said television picture and to one side of said sample position of said error sample signal the expected value of a seventh sample signal adjacent to said sample position of said error sample signal, checking said expected value of said seventh sample signal against the actual value of said seventh sample signal, and suppressing said tenth concealment accuracy if its calculation involves the use of any error sample signal;

means for calculating an eleventh concealment accuracy by calculating from available sample signals disposed along said fourth direction of said television picture and to the other side of said position of said error sample signal the expected value of an eighth sample signal adjacent to said sample position of said error sample signal, checking said expected value of said eighth sample signal against the actual value of said eighth sample signal, and suppressing said eleventh concealment accuracy if its calculation involves the use of any error sample signal; and means for calculating a twelfth concealment accuracy as the sum of said tenth and eleventh concealment accuracies when neither said tenth nor said eleventh concealment accuracy is suppressed.

8. Apparatus according to claim 7 wherein said first, second, third and fourth directions are the horizontal, vertical, positive diagonal and negative diagonal directions respectively of said television picture.

9. Apparatus according to claim 8 wherein first, second and third algorithms are used to calculate respective said first, second and third horizontal concealment accuracies $H_1$, $H_2$ and $H$ as follows:

$$H_1 = |\tfrac{1}{2}[(n-1),S-1+(n-1),S1] - (n-1),S0|$$

$$H_2 = |\tfrac{1}{2}[(n+1),S-1+(n+1),S1] - (n+1),S0|$$

$$H = \tfrac{1}{2}(H_1 + H_2)$$

where n,S0 represents the sample value at a sample position S0 in a horizontal scan line n; fourth, fifth and sixth algorithms are used to calculate respective said fourth, fifth and sixth vertical concealment accuracies $V_1$, $V_2$ and $V$ as follows:

$$V_1 = |\tfrac{1}{2}[(n-1),S-1+(n+1),S-1] - n,S-1|$$

$$V_2 = |\tfrac{1}{2}[(n-1),S1+(n+1),S1] - n,S1|$$

$$V = \tfrac{1}{2}(V_1 + V_2)$$

seventh, eighth and ninth algorithms are used to calculate respective said positive diagonal concealment accuracies $D_1^+$, $D_2^+$ and $D^+$ as follows:

$$D_1^+ = |\tfrac{1}{2}[(n-1),S0+(n+1),S-2] - n,S-1|$$

$$D_2^+ = |\tfrac{1}{2}[(n-1),S2+(n+1),S0] - n,S1|$$

$$D^+ = \tfrac{1}{2}(D_1^+ + D_2^+)$$

and tenth, eleventh and twelfth algorithms are used to calculate respective said negative diagonal concealment accuracies $D_1^-$, $D_2^-$ and $D^-$ as follows:

$$D_1^- = |\tfrac{1}{2}[(n-1),S-2+(n+1),S0] - n,S-1|$$

$$D_2^- = |\tfrac{1}{2}[(n-1),S0+(n+1),S2] - n,S1|$$

$$D^- = \tfrac{1}{2}(D_1^- + D_2^-).$$

10. Apparatus according to claim 9 further comprising means to multiply each said concealment accuracy by a weighting factor corresponding to the reciprocal of the distance between adjacent sample positions in the respective horizontal, vertical, positive diagonal and negative diagonal directions and said preferred direction is then selected using the algorithm giving the lowest value of concealment accuracy after said multiplication.

* * * * *